United States Patent Office 2,699,924
Patented Jan. 18, 1955

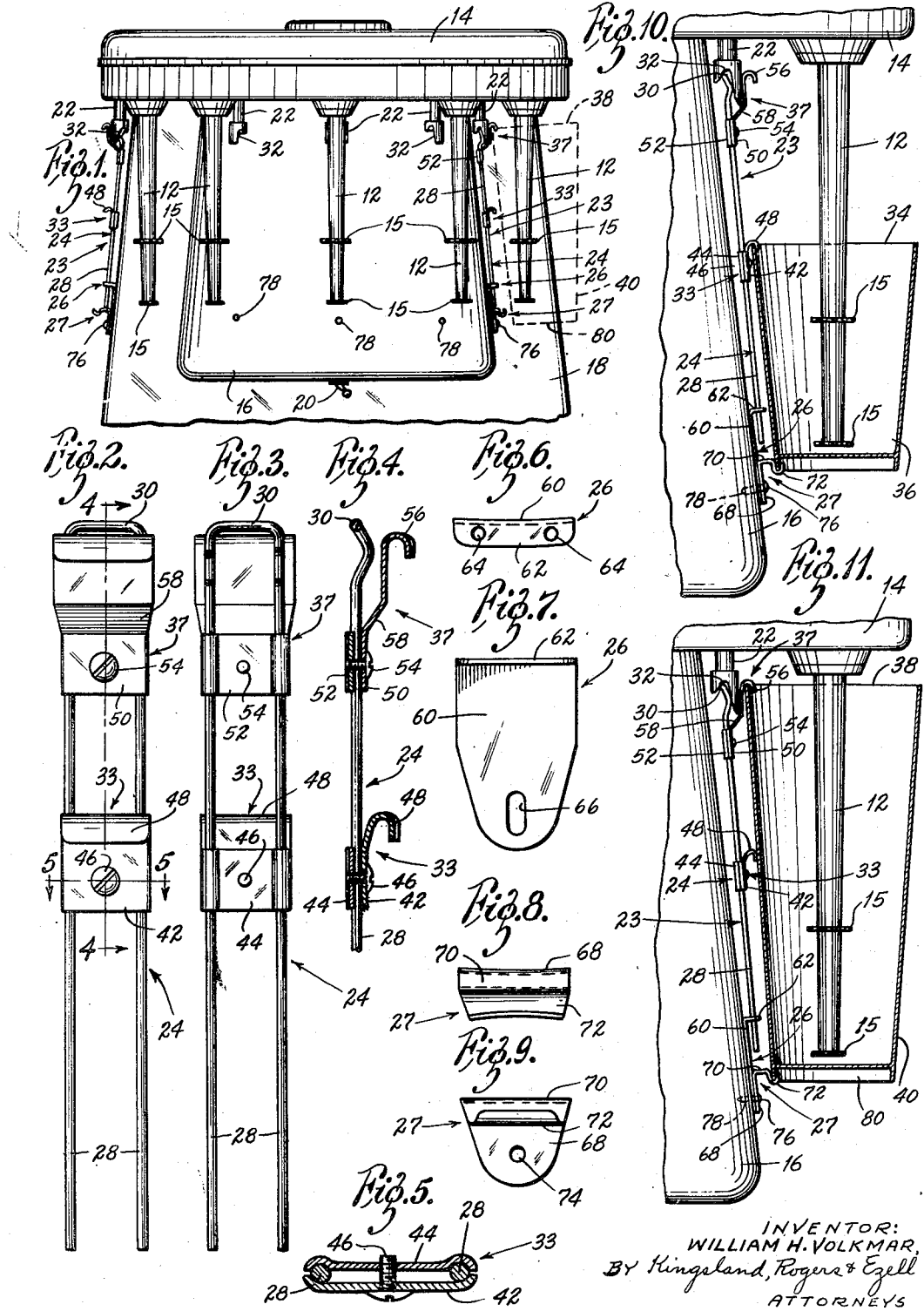

2,699,924

CONTAINER SUPPORTING ADAPTER

William H. Volkmar, Sioux Falls, S. Dak., assignor to Prince Castle Manufacturing Division Inc., Sterling, Ill., a corporation Application July 5, 1952, Serial No. 297,220

10 Claims. (Cl. 259—108)

The present invention relates generally to novel and improved means for releasably supporting an open container during the mechanical mixing of the ingredients therein contained; for effecting the energization of the mixing apparatus simultaneously with the placement of the container; and for effecting the subsequent deenergization of said apparatus following the removal of said container.

More particularly, the invention relates to a novel multi-position container supporting device for incorporation in a conventional apparatus of the type employed to intermingle ice cream and other selected ingredients such as malt, milk, eggs, flavoring, and the like, in order to provide a refreshing and delectable food in drinkable form.

Primarily, the invention is concerned with mixing machines adapted to process the contents of a plurality of containers simultaneously, although it is to be understood that the invention may likewise attain its objectives when incorporated in mixing machines adapted to process the contents of but a single container at one time.

A typical conventional multi-mixing machine of this nature includes a pedestal; an electric motor enclosed in an inverted dome-shaped portion of a casing dependently supported from the upper end portion of the pedestal; a series of semicircularly spaced rotatable spindles extending downwardly from the head portion of the casing in radially spaced relation to said dome-shaped portion; a pair of vertically spaced agitator discs on each spindle; suitable transmission mechanism enclosed in the head portion of the machine casing for selectively actuating said spindles either individually or in unison; and an actuator depending from said head portion adjacent each spindle for controlling the rotary movements of the latter.

The operation of this type of machine is well understood, and will not be described in detail. Suffice it to say that, in the normal disposition of each actuator, the spindle controlled thereby is idle. A slight elevation of the actuator automatically effects the rotation of said spindle, which rotation continues until the actuator is permitted to descend to its normal position.

Elevation of each actuator is effected by manually positioning a container about the spindle controlled thereby, the upper rim of said container engaging in a downwardly opening V-groove of the actuator, and raising the latter as the container is swung arcuately upwardly into position, with its lower rim being simultaneously brought to rest upon a hook member rigid with said dome-shaped portion of the casing. Among the disadvantages heretofore attending these mixing operations, the most unfavorable has been the lack of means for processing containers of different sizes. In other words, these machines are designed for the largest sized containers employed in mixing drinks of this kind, and require the addition of angular adapter rings to increase the height of smaller containers in order to reach the actuators, as is understood. It should be noted that the small or half-sized drink is just as popular as the large, so that an attendant is, so to speak, ordinarily required to devote as much time to the proper placement of adapter rings as to any of his other duties.

A primary object of the present invention is to provide a device for permanent association with each spindle which obviates the requirement of the said adapter rings for the smaller sized containers.

Another object is to provide a composite device which may be adjusted to accommodate containers of different sizes without removing the device from its installed position.

An additional inherent disadvantage of the conventional machines under consideration relates to sanitation. That is to say, during a busy season, an attendant has no time to cleanse the adapter rings, or to remove the splashings which tend to accumulate on the actuators, the major portions of which project either into the containers on the one hand, or into the adapter rings on the other hand, as should be apparent.

Therefore, another object of the invention is to provide a composite device adapted not only to accommodate containers of non-uniform capacity, but adapted also to process the container contents without permitting any of the latter to reach the actuators.

Briefly, the composite device comprising the present invention includes an adapter assembly, a guide bracket therefor, and a supporting bracket for the lower end thereof, the latter bracket also serving to support the lower rim portion of a container. The guide and the supporting bracket are mounted on the machine by means of a single screw. The adapter assembly includes a first pair of companion plates adjustably mounted to so space an upper rim-engaging segment of one of them a distance from the supporting bracket aforesaid corresponding to the height of a small container, a second pair of companion plates adjustably mounted to so space an upper rim-engaging segment of one of them a distance from the supporting bracket aforesaid corresponding to the height of a large container; and means mounted in constant engagement with one of the actuators of the machine for elevating said actuator simultaneously with the positioning of a container, as will appear.

A more comprehensive understanding of the invention may be had from the detailed description thereof to follow with reference to the accompanying drawing, wherein the preferable embodiment is illustrated.

In said drawing:

Fig. 1 is a front elevational view of the upper portion of a conventional multi-spindle mixing machine, portraying the present invention mounted thereon in operative relation to two of the five included spindles with which said machine is equipped;

Fig. 2 is a front elevational view of the adapter assembly per se;

Fig. 3 is a rear elevational view thereof;

Fig. 4 is a vertical sectional view taken on the line 4—4 of Fig. 2;

Fig. 5 is a horizontal sectional view on an enlarged scale, taken on the line 5—5 of Fig. 2;

Fig. 6 is a view in top plan of a guide bracket for accommodating vertical movements of said adapter assembly;

Fig. 7 is a front elevational view of said guide bracket;

Fig. 8 is a top plan view of a container supporting bracket;

Fig. 9 is a front elevational view of said supporting bracket;

Fig. 10 is a fragmentary view illustrating the invention in operative disposition relative to a small container; and Fig. 11 is a similar view illustrating the invention in operative disposition relative to a large container.

In Fig. 1, the present invention is shown applied to a pair of the five spindles 12 with which the illustrated upper portion of a conventional mixing machine is equipped. The spindles 12 depend from the head portion 14 of a casing, which also includes a depending inverted dome-shaped portion 16, said casing being formed integrally with and projecting forwardly from the upper end of a pedestal 18. The dome-shaped portion 16 encloses an electric motor which is not shown and which may be turned on and off by manipulating the switch 20.

With the switch 20 in the "on" position, the transmission which the head portion 14 encloses is in continuous operation. The spindles 12, however, are idle, but each of them may be rotatably driven individually by the elevation of an actuator 22 associated with each of said spindles. Numeral 15 indicates the agitator discs on each spindle 12.

The construction and operation of the mixing machinery thus far described are well known and understood. That no changes in the said construction and operation are required is a feature of the present invention.

The composite device comprising the present invention is designated in assembled relation by the numeral 23. It includes an adapter assembly 24, a guide bracket 26, and a container supporting bracket 27.

The adapter assembly 24 includes a slender-formed rod having a pair of spaced vertically disposed leg segments 28 joined at the top by a horizontally disposed segment 30, whereby to form said rod into a substantially hairpin configuration. As particularly portrayed in Figs. 4, 10, and 11, the upper ends of the legs 28 are so contoured as to operatively engage the segment 30 in the downwardly opening V-groove 32 of the actuator 22.

The assembly 24 further includes vertically adjustable retaining means 33 for receiving and releasably retaining the upper rim 34 of an exemplary small container 36; and similar retaining means 37 for receiving and releasably retaining the upper rim 38 of an exemplary large container 40.

The first retaining means 33 consists of a front plate 42, a rear plate 44, and a screw 46, as appears to best advantage in Fig. 5. The side marginal edge portions of said plates are arcuately formed so as to cooperatively engage the legs 28, whereby to clamp the plates 42 and 44 in selected position thereon when the screw 46 is tight. The upper end of the plate 42 terminates in a reversely bent downwardly projecting segment 48, as best seen in Figs. 2 and 4.

The second retaining means 37 consists of a front plate 50, a rear plate 52, a screw 54, and, as the drawings amply demonstrate, is similar in construction with the described retaining means 33. However, for a reason to appear a reversely bent segment 56 of the plate 52 is disposed forwardly of the similar segment 48 of the plate 42, there being an angular offset segment 58 formed in the plate 50, as seen to best advantage in Fig. 4.

The guide bracket 26 associated with each adapter assembly 24 is of angular configuration, and includes a vertical segment 60 terminating at the top in a forwardly extending horizontal flange segment 62, the latter provided with a pair of spaced circular openings 64, each of which slidably receives one of the legs 28 of the adapter assembly 24. Preferably, as shown in Fig. 6, the segment 60 is arcuately formed to firmly engage against the casing 16; and as illustrated in Fig. 7, said segment has formed therein an elongated slot 66. The bracket 27 associated with each adapter assembly, and which is particularly illustrated in Figs. 8 and 9, includes an arcuately contoured vertical segment 68; a horizontally disposed segment 70; a channel-shaped segment 72; and a circular opening 74, the latter provided in the segment 70 for the reception of a screw 76, which also passes through the slot 66 of the guide member 26 to engage in a threaded aperture 78 provided therefor in the dome-shaped portion 16 of the casing.

Although it is believed that the foregoing description augmented by an inspection of the drawing would seem to comprehensively demonstrate the manner in which this invention achieves its objectives, a brief explanation will be given.

Operation

It will be assumed that Fig. 1 illustrates the mixing machine in idle status, the switch being in its "off" position, and the actuators 22 being in their lower positions. Although, in the interest of illustrative clarity, the invention is shown applied to only two of the five spindles 12, it is understood that in practice the invention is likewise applied to the remaining spindles.

It is noted that, when the machine is idle, the adapter segments 30 are engaged in the grooves 32 of the actuators and maintained in such position by the horizontal segments 70 of the brackets 27. In other words, when applying the composite device 23 to the machine, the brackets 26 and 27 are so mounted that the bottom extremities of each pair of legs 28 rest upon and are supported by one of the segments 70, with the lower portions of said legs slidably supported in the circular openings 64 of the flange 62.

It will also be assumed that the lower series of companion plates 42—44 has been adjusted and clamped in position by means of the screws 46 to accommodate a small container such as that designated 36 in Fig. 10, and that the upper series of companion plates 50—52 has been adjusted and clamped in position by means of the screw 54, to accommodate a large container such as that designated 40 in Figs. 1 and 11.

In order to render the mixing machine operative, the attendant flips the switch 20 to its "on" position, thus energizing the motor to continuously drive the transmission, as is understood. As previously noted, however, each spindle 12 remains idle so long as its associated actuator 22 remains in the normal lowered position thereon shown in Fig. 1.

Assuming now that it is desired to subject the ingredients of a large container 40 to the action of the machine, the attendant first positions said container about one of the spindles 12, and then swings it arcuately upwardly until its upper rim 38 engages in the segment 56, as portrayed by broken lines in Fig. 1. As the container is now raised upwardly to seat its lower rim 80 in the channel 72 of the bracket 27, the actuator 22 is concurrently elevated from its Fig. 1 to its Fig. 11 position, thus effecting the rotation of the spindle.

With particular reference to Fig. 11, it is noted that the offset disposition of the segment 56 relative to the segment 48 not only facilitates the placement of the container 40, but also the removal thereof, since the last-named segment provides a guide for the body portion of the container. In addition, the segment 48 tends to stabilize said container during the high speed mixing operation, which operation terminates when the container is removed. Small containers 36 are placed and removed similarly to the container 40, but with respect to the segment 48.

From the foregoing, it should be apparent that a novel and simple device has been provided for attaining the objectives of this invention. It is to be understood, however, that the illustrated and described embodiment thereof may be modified without departing from the principles of the invention. The novel device may be readily adapted to various mixing machines.

Therefore, the invention contemplates any modification of structure or substitution of equivalents which may fall within the scope of the appended claims.

What is claimed is:

1. A device for use with a mixing machine of the character described, said device including: fixed means for receiving and supporting the lower rim of either a large or a small container; means for receiving and releasably retaining the upper rim of a large container; means for receiving and releasably retaining the upper rim of a small container; means connecting both of the two rim retaining means into an assembly for engaging and elevating an actuator of said machine irrespective of whether a large or a small container is being manipulated into position; and means for constantly maintaining the last-named means in operatable relationship with said actuator.

2. The device of claim 1 wherein the recited means for receiving the upper rim of a large container includes: a slender rod of substantially hairpin configuration including a pair of vertically disposed leg segments joined at the top by a horizontally disposed web segment; companion front and rear plates each having arcuately formed side marginal edges for engaging the legs on opposite sides thereof; a screw engaging both plates for clamping the latter in a selected plane to said legs; a reversely bent downwardly projecting segment for engaging said container rim, said segment being coplanar with, but offset forwardly relative to, the front plate; and an angularly disposed segment connecting the reversely bent segment with the upper end of the front plate.

3. The device of claim 1 wherein the recited means for receiving the upper rim of a small container includes: a slender rod of substantially hairpin configuration including a pair of vertically disposed leg segments joined at the top by a horizontally disposed web segment; companion front and rear plates each having arcuately formed side marginal edges for engaging the legs on opposite sides thereof; a screw engaging both plates for clamping the latter in a selected plane to said legs; and a reversely bent downwardly projecting segment formed on the upper end of the front plate for engaging said container rim.

4. The device of claim 1 wherein the recited means for engaging and elevating an actuator of the machine includes: a slender rod of substantially hairpin configuration including a pair of vertically disposed leg segments; a horizontally disposed web segment connecting said legs at the top and engaging in a downwardly opening groove provided in the actuator; a fixed guide bracket for slidably receiving the lower end portions of said legs; means adjustably mounted on upper portions of said legs for the reception of the upper rim of a large container whereby to automatically elevate said actuator concurrently with the manipulation into position of said large container; and means adjustably mounted on intermediate portions of said legs for the reception of the upper rim of a small container whereby to automatically elevate said actuator concurrently with the manipulation into position of said small container.

5. A container supporting adapter for use with a mixer of the type having a base, a spindle depending alongside the base, a depending actuator liftable with respect to the base and adapted when lifted to cause the spindle to rotate, and a cup engaging support device in fixed elevation on the base to engage and support the bottom of a container: the adapter comprising an adapter member having means to connect it with the actuator for up and down movement therewith, the connecting means having engagement with the actuator to lift the actuator when the member is lifted, the member having a depending portion extending downwardly from the connecting means toward the cup engaging support device, guide means to hold said depending portion for vertical movement in line with lifting movement of the actuator, cup-rim retaining means engageable in holding relationship with the upper rim of a container, secured to the depending portion of the member and movable therewith, and an additional cup-rim retaining means on the adapter member at an elevation above the first-named retaining means.

6. A container supporting adapter for use with a mixer of the type having a base, a spindle depending alongside the base, a depending actuator liftable with respect to the base and adapted when lifted to cause the spindle to rotate, and a cup engaging support device in fixed elevation on the base to engage and support the bottom of a container: the adapter comprising an elongated adapter member having means at its top to engage it with the actuator for lifting the actuator when the member is moved upwardly; a guide bracket having guide means with which the adapter member engages, so that the movement of the member is confined to a predetermined path, the guide bracket being attachable to the base of the mixer below the actuator; means to limit downward movement of the adapter member; a first cup-rim retaining means and a clamp for securing the same selectively in adjustable positions up and down the adapter member; and an upper cup-rim retaining means at the upper end of the adapter member and being disposed outwardly to enable it to engage a top rim of a cup with its bottom engaged in the cup engaging support.

7. A container supporting adapter for use with a mixer of the type having a base, a spindle depending alongside the base, a depending actuator liftable with respect to the base and adapted when lifted to cause the spindle to rotate, and a cup engaging support device in fixed elevation on the base to engage and support the bottom of a container: the adapter comprising an elongated adapter member having means to engage the actuator, and a plurality of container rim engaging elements mounted on the member, the elements being spaced at different distances outwardly from the elongated member with the upper member further out than the lower, so that a container may be engaged with the upper member without obstruction by the lower element.

8. In a mixer: a base, a spindle depending alongside the base, means elevatable to cause the spindle to rotate, including a member depending along the base, connected with the elevatable means and also being liftable to elevate the said means, guide means to hold the depending member to vertical movement, a lower container holding element on the base, a first container rim engaging element on the depending member having an overhanging portion engageable by the upper rim of a container, and a second, like container rim engaging element on the depending member above the first one; the upper element projecting outwardly from the base more than the first, and sufficiently to enable it to be engaged by a container rim without interference from the first one.

9. An adapter for use with a mixer of the type having a support, a spindle depending alongside said support and a depending actuator engageable by the rim of a mixing vessel and liftable thereby with respect to said support and adapted when lifted to cause said spindle to rotate, said adapter effectively converting said actuator for actuation by the rims of mixing vessels of different sizes, said adapter comprising an elongated member, means for removably securing said member to said support for limited relative vertical movement with respect to said support, means adjacent the upper end of said member engageable with said depending actuator whereby vertical movement in the upward direction of said member causes lifting of said actuator, and a cup rim retaining means secured to said member and selectively adjustable to assume a plurality of different vertical positions on said member.

10. A container supporting adapter for use with a mixer of the type having a base, a spindle depending alongside the base, a depending actuator liftable with respect to the base and adapted when lifted to cause the spindle to rotate, and a cup engaging support device in fixed elevation on the base to engage and support the bottom of a container: the adapter comprising an adapter member having means to connect it with the actuator for up and down movement therewith, the connecting means having engagement with the actuator to lift the actuator when the member is lifted, the member having a depending portion extending downwardly from the connecting means toward the cup engaging support device, guide means to hold said depending portion for vertical movement in line with lifting movement of the actuator, and cup-rim retaining means engageable in holding relationship with the upper rim of a container adjustably secured to the depending portion of the member and movable therewith, said cup-rim retaining means being adjustable along said depending portion to accommodate cups of different sizes.

References Cited in the file of this patent

UNITED STATES PATENTS

| | | |
|---|---|---|
| 1,465,634 | Gilchrist | Aug. 21, 1923 |
| 1,764,338 | Nielsen | June 17, 1930 |
| 2,218,808 | Brotheridge | Oct. 22, 1940 |
| 2,345,479 | Johnson | Mar. 28, 1944 |